(12) United States Patent
Rao et al.

(10) Patent No.: US 12,513,389 B2
(45) Date of Patent: Dec. 30, 2025

(54) CAMERA PARAMETER ENHANCEMENT FOR MULTIPLE ANALYTICS

(71) Applicant: NEC Laboratories America, Inc., Princeton, NJ (US)

(72) Inventors: Kunal Rao, Monroe, NJ (US); Sibendu Paul, West Lafayette, IN (US); Giuseppe Coviello, Robbinsville, NJ (US); Murugan Sankaradas, Dayton, NJ (US); Oliver Po, San Jose, CA (US); Srimat Chakradhar, Manalapan, NJ (US)

(73) Assignee: NEC Corporation, Tokyo (JP)

( * ) Notice: Subject to any disclaimer, the term of this patent is extended or adjusted under 35 U.S.C. 154(b) by 145 days.

(21) Appl. No.: 18/495,064

(22) Filed: Oct. 26, 2023

(65) Prior Publication Data

US 2024/0147054 A1 May 2, 2024

Related U.S. Application Data

(60) Provisional application No. 63/420,235, filed on Oct. 28, 2022.

(51) Int. Cl.
*H04N 23/60* (2023.01)
*H04N 23/76* (2023.01)

(52) U.S. Cl.
CPC ............ *H04N 23/64* (2023.01); *H04N 23/76* (2023.01)

(58) Field of Classification Search
CPC .... G06N 3/08; G06N 3/0472; H04N 5/23245; H04N 5/23227; H04N 5/232127; H04N 23/617; H04N 23/76; H04N 23/64
See application file for complete search history.

(56) References Cited

U.S. PATENT DOCUMENTS

2020/0007781 A1\* 1/2020 Aoba ...................... G06N 3/08

OTHER PUBLICATIONS

Dao et al., "Accurate and Timely Situation Awareness Retrieval from a Bandwidth Constrained Camera Network", In 2017 IEEE 14th International Conference on Mobile Ad Hoc and Sensor Systems (MASS) Oct. 22, 2017, pp. 416-425.
Hsieh et al., "Focus: Querying Large Video Datasets with Low Latency and Low Cost", In13th USENIX Symposium on Operating Systems Design and Implementation (OSDI 18) Oct. 2018, pp. 269-286.
Jain et al., "Panoptes: Servicing Multiple Applications Simultaneously using Steerable Cameras", InProceedings of the 16th ACM/IEEE International Conference on Information Processing in Sensor Networks Apr. 18, 2017, pp. 119-130.
Jang et al., "Application-aware IoT Camera Virtualization for Video Analytics Edge Computing", In 2018 IEEE/ACM Symposium on Edge Computing (SEC) Oct. 25, 2018, pp. 132-144.

(Continued)

*Primary Examiner* — Xi Wang
(74) *Attorney, Agent, or Firm* — Joseph Kolodka; Vincent Duffy (57) ABSTRACT

Methods and systems for camera configuration include configuring an image capture configuration parameter of a camera according to a multi-objective reinforcement learning aggregated reward function. Respective quality estimates for analytics are determined after configuring the image capture parameters. The aggregated reward function is updated based on the quality estimates.

20 Claims, 8 Drawing Sheets

(56) References Cited

OTHER PUBLICATIONS

Jiang et al., "Chameleon: Scalable Adaptation of Video Analytics", In Proceedings of the 2018 conference of the ACM special interest group on data communication Aug. 7, 2018, pp. 253-266.

Kang et al., "NoScope: Optimizing Neural Network Queries over Video at Scale", arXiv:1703.02529v3 [cs.DB] Aug. 8, 2017, pp. 1-12.

Mittal et al., "No-Reference Image Quality Assessment in the Spatial Domain", IEEE Transactions on image processing. Aug. 17, 2012, pp. 1-14.

Paul et al., "Enhancing Video Analytics Accuracy via Real-time Automated Camera Parameter Tuning", In Proceedings of the 20th ACM Conference on Embedded Networked Sensor Systems Nov. 6, 2022, pp. 291-304.

Qureshi et al., "Planning Ahead for PTZ Camera Assignment and Handoff", In2009 Third ACM/IEEE International Conference on Distributed Smart Cameras (ICDSC) Aug. 30, 2009, pp. 1-8.

Sharma et al., "MultiSense: Fine-grained Multiplexing for Steerable Camera Sensor Networks", In Proceedings of the second annual ACM conference on Multimedia systems Feb. 23, 2011, pp. 23-34.

Sprague et al., "Multiple-Goal Reinforcement Learning with Modular Sarsa(0)", http://hdl.handle.net/1802/339, Apr. 2004, pp. 1-3.

Tong et al., "Large-Scale Vehicle Trajectory Reconstruction with Camera Sensing Network", InProceedings of the 27th Annual International Conference on Mobile Computing and Networking Sep. 9, 2021, pp. 188-200.

Zhang et al., "AWStream: AdaptiveWide-Area Streaming Analytics", InProceedings of the 2018 Conference of the ACM Special Interest Group on Data Communication Aug. 7, 2018, pp. 236-252.

Zhang et al., "Live Video Analytics at Scale with Approximation and Delay-Tolerance", In14th USENIX Symposium on Networked Systems Design and Implementation (NSDI 17) Mar. 2017, pp. 377-392.

Liu et al., "Multiobjective Reinforcement Learning: a Comprehensive Overview", IEEE Transactions on Systems, Man, and Cybernetics: Systems, vol. 45, No. 3, Mar. 2015, pp. 385-398.

Yao et al., "Adaptive online camera coordination for multi-camera multi-target surveillance", in Computer Vision and Image Understanding, Apr. 2010, pp. 463-474.

\* cited by examiner

```
Input: N = Number of AUs/objectives
Input: K = Number of episodes
1  Initialize State s
2  Initialize Q table for each AU and Q_aggregate (N+1
   Q-tables)
   // During exploration upto episode K
3  while Still-Processing() do
4  |    a ← Choose-Action(Q_aggregate, s)
5  |    Perform-Action(a)
6  |    s' ← Observe-Environment()
7  |    for AU i = 1, 2, ..., N do
   |        // AU-specific quality estimation
8  |        r_i ← Compute-Reward()
   |        // Bellman optimality equation
9  |        Q_i (s,a) ← Q_i (s,a) + α × [r_i + γ × Q_i (s', a') -
   |           Q_i (s, a)]
10 |    end
   |    // optimal aggregation policy
11 |    Q_aggregate (s,a) ← Aggregate (Q (s,a))
12 |    s ← s'
13 end
```

CAMERA PARAMETER ENHANCEMENT FOR MULTIPLE ANALYTICS

RELATED APPLICATION INFORMATION

This application claims priority to U.S. Patent No. 63/420,235, filed on Oct. 28, 2022, incorporated herein by reference in its entirety.

BACKGROUND

Technical Field

The present invention relates to video analytics and, more particularly, to setting parameters in video capture devices.

Description of the Related Art

Video cameras are used in a variety of applications, such as for use in security monitoring. As the number of video surveillance systems increases, so too does the amount of video information. Performing analytics on such large amounts of data is challenging, as the complexity of the analytics increases along with the amount of information that is being analyzed. To amortize the high cost of deploying video cameras, multiple analytics may be performed on a single video stream.

SUMMARY

A method for camera configuration includes configuring an image capture configuration parameter of a camera according to a multi-objective reinforcement learning aggregated reward function. Respective quality estimates for analytics are determined after configuring the image capture parameters. The aggregated reward function is updated based on the quality estimates.

A system for camera configuration includes a hardware processor and a memory that stores a computer program. When executed by the hardware processor, the computer program causes the hardware processor to configure an image capture configuration parameter of a camera according to a multi-objective reinforcement learning aggregated reward function, to determine respective quality estimates for a plurality of analytics after configuring the image capture parameters, and to update the aggregated reward function based on the quality estimates.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Video streams are increasingly generated by internet of things (IoT) devices, which may be deployed to perform a variety of computer vision tasks in industries such as retail, healthcare, safety and security, transportation, and manufacturing. Deploying new cameras involves a significant amount of effort and investment, both in acquiring and provisioning the new hardware and in physically placing the hardware in a target environment. As a result, multiple types of video analytics may be performed on a single video stream, generated by a single camera, to maximize the value of that hardware.

Video analytics may extract any appropriate type of information from a video stream, using any appropriate type of analysis. For example, different types of analytics may be used to perform motion estimation, pose estimation, accident prediction, anomaly detection, face recognition, age estimation, gender classification, license plate recognition, object detection, object classification, person detection, and face detection. Multiple such analytics may be performed on a single raw video stream from single camera. While machine learning models are specifically contemplated for the performance of the analytics, any appropriate type of analysis model may be used.

The quality of the analysis may depend on the quality of the raw video stream that is provided by the camera. The quality of the video stream may vary according to a number of conditions, including camera age, camera damage, occlusions, lighting, and environmental conditions, such as weather conditions, dust, temperature, humidity, and precipitation. The parameters of the camera may be dynamically adjusted to improve the quality of the video.

Some types of analytics may benefit from particular camera parameters, while other types of analytics may benefit from different camera parameters. Thus, it may be difficult to set the camera configuration parameters in a way that will provide optimal results across multiple different types of analytics. Furthermore, it may be difficult to predict the actual conditions in which the camera will operate, before it is deployed. Thus, the parameters may be optimized in a dynamic fashion, to enhance the performance across multiple different, and potentially conflicting, analysis needs.

Figure 1:
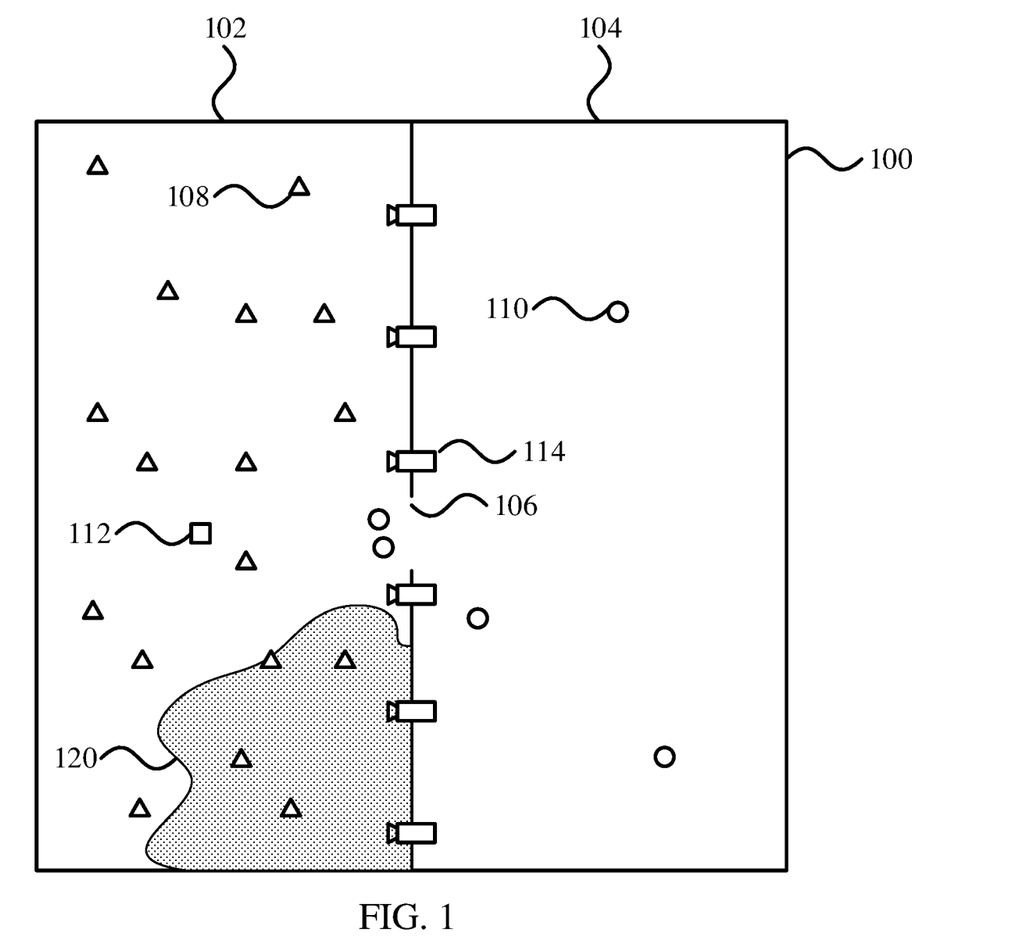
FIG. 1 is a diagram of an exemplary image capture environment with dynamic conditions that affect image analytic quality, in accordance with an embodiment of the present invention.

Referring now in detail to the figures in which like numerals represent the same or similar elements and initially to FIG. 1, an environment 100 is shown. For example, one type of environment that is contemplated is a mall or shopping center, which may include a common space 102 and one or more regions 104, such as a store. It should be understood that this example is provided solely for the purpose of illustration, and should not be regarded as limiting.

A boundary is shown between the common space 102 and the region 104. The boundary can be any appropriate physical or virtual boundary. Examples of physical boundaries include walls and rope—anything that establishes a physical barrier to passage from one region to the other. Examples of virtual boundaries include a painted line and a designation within a map of the environment 100. Virtual boundaries do not establish a physical barrier to movement, but can nonetheless be used to identify regions within the environment. For example, a region of interest may be established next to an exhibit or display, and can be used to indicate people's interest in that display. A gate 106 is shown as a passageway through the boundary, where individuals are permitted to pass between the common space 102 and the region 104.

The environment 100 is monitored by a number of video cameras 114. Although this embodiment shows the cameras 114 being positioned at the gate 106, it should be understood that such cameras can be positioned anywhere within the common space 102 and the region 104. The video cameras 114 capture live streaming video of the individuals in the environment. A number of individuals are shown, including untracked individuals 108, shown as triangles, and tracked individuals 110, shown as circles. Also shown is a tracked person of interest 112, shown as a square. In some examples, all of the individuals may be tracked individuals. In some examples, the tracked person of interest 112 may be tracked to provide an interactive experience, with their motion through the environment 100 being used to trigger responses.

In addition to capturing visual information, the cameras 114 may capture other types of data. For example, the cameras 114 may be equipped with infrared sensors that can read the body temperature of an individual. In association with the visual information, this can provide the ability to remotely identify individuals who are sick, and to track their motion through the environment.

The environment 100 may include different environmental conditions. For example, a region 120 may include haze or dust that affects the video captured by a camera 114. Some areas may have better or worse lighting, or may be more affected by external light levels during the day.

Figure 2:
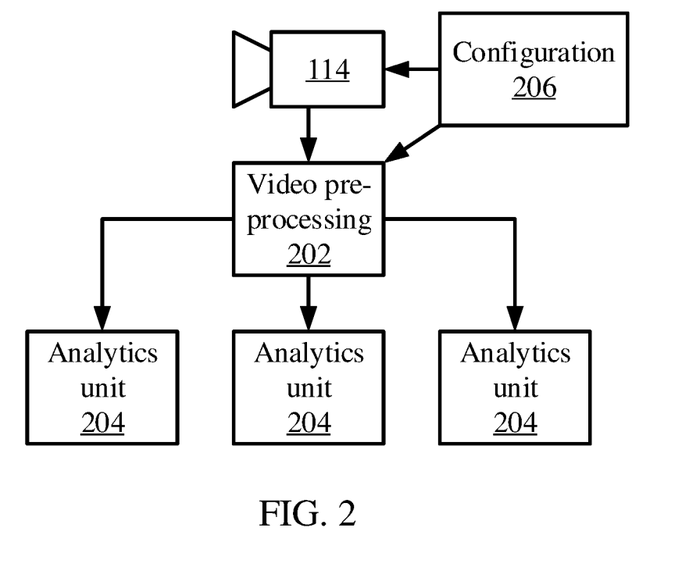
FIG. 2 is a block diagram of an image capture parameter configuration system that configures image capture parameters responsive to analytics quality, in accordance with an embodiment of the present invention.

Referring now to FIG. 2, a system of processing a video stream is shown. A single camera 114 is shown, which captures visual information and generates a stream of images as a video stream. This video stream may undergo some amount of pre-processing 202, for example with compression or other modifications made within the camera 114 or otherwise before the video is analyzed.

Multiple analytics units 204 analyze the video stream according to different respective goals. For example, a first analytics unit 204 may perform person detection, a second may perform face recognition, and a third may perform action recognition. Each of these analytics units 204 may have different needs for the video stream that it receives. To meet these needs, configuration 206 may be applied to the camera 114 and to the video pre-processing 202. The configuration 206 may change parameters by which the camera 114 captures images and by which the pre-processing 202 modifies those images to form the output video stream.

The analytics units 204 may be implemented using machine learning models, such as deep-learning-based convolutional neural network models. These models may be trained, using large datasets of images, to perform specific computer vision tasks. To improve the performance of an analytics unit 204, the design of analytics unit 204 itself may be improved or the quality of data input to the analytics unit 204 may be improved. Higher quality input data (e.g., data that more closely reflects the data that was used during training of the model) increases the likelihood of obtaining accurate results from the analytics unit 204.

The quality of the input data can be improved in a number of ways. First, the physical environment of the camera 114 may be improved, for example by increasing the light levels or cleaning the camera's lens. A second way to improve the quality of the input data is to apply a data transformation on individual frames of the video feed during pre-processing 202. A third way is to tune parameters of the camera 114 to help the camera capture high-quality video.

Tuning the camera parameters may be achieved with multi-objective reinforcement learning, where a reinforcement learning agent attempts to optimize the objectives of different analytics units 204 to best enhance the performance across all of the analytics units 204. Analytics-specific quality estimator values may be generated for each individual analytics unit 204. These estimators may be used as proxies for estimating analytic accuracy in the absence of a ground truth, which may not otherwise be available during real-time operation of the analytics units 204.

Figure 3:
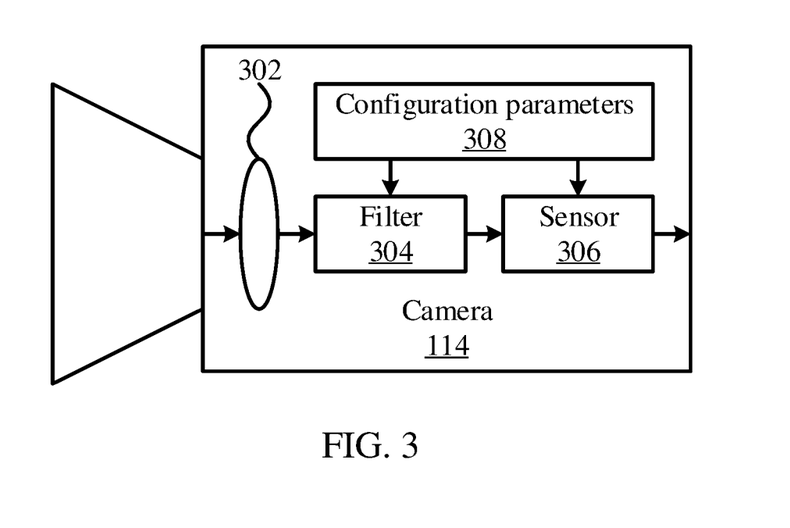
FIG. 3 is a block diagram of a camera with configurable image capture parameters, in accordance with an embodiment of the present invention.

Referring now to FIG. 3, additional detail on the camera 114 is shown. The camera receives light from the environment 100 via lens 302. A filter 304 processes the light from the lens, for example by applying a fixed or dynamic change to the incoming light, before a sensor 306 converts the visual information from photonic information to digital information. The digital information collected within a given time period may be assembled into an image frame, which may then be transmitted onward for pre-processing and analytics. For example, the sensor 306 may include a charge-coupled device (CCD) sensor, an electron-multiplying charge-coupled device (EMCCD) sensor, or a complementary metal-oxide-semiconductor (CMOS) sensor.

Configuration parameters 308 may be applied to the filter 304 and the sensor 306 to control how the incoming light is processed and converted to digital information. Such configuration parameters may control brightness, contrast, color, and sharpness. In some cases, the configuration parameters 308 may control a focal length of the lens 302, which may be changed to change the focus of the camera 114.

Figure 4:
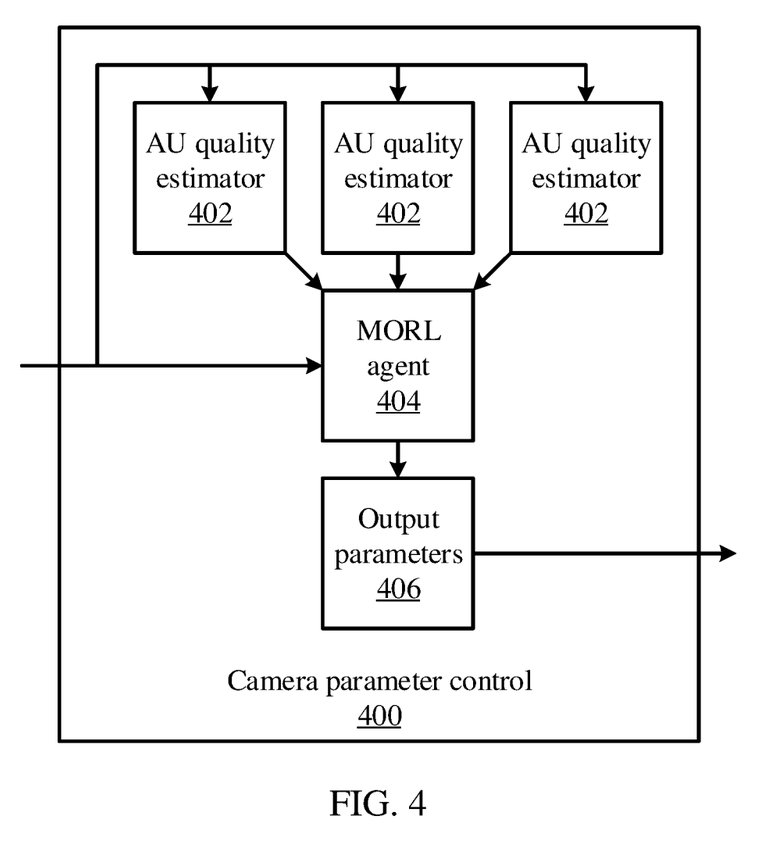
FIG. 4 is a block diagram of a camera configuration parameter control that is responsive to analytics quality, in accordance with an embodiment of the present invention.

Referring now to FIG. 4, a camera parameter control 400 is shown. The control 400 receives video frames from the camera 114, which are sent as input to a set of analytics unit quality estimators 402 and to a multi-objective reinforcement learning agent 404. The agent 404 uses the quality estimators 402 as reward functions for the respective analytics units 204.

The agent 404 implements reinforcement learning to balance the contributions of multiple different reward functions. This corresponds to finding a balance between the needs of the analytics units 204 when setting parameters for the camera. Thus, the state of the reinforcement learning agent 404 may be a tuple of two vectors $s=<P_t, M_t>$, where $P_t$ includes camera settings at a time t and where $M_t$ includes measured values corresponding to the camera settings, as found in a given captured frame, at t. Thus, for example, $P_t$ may be a vector that includes a value for a brightness setting at the camera 114, while $M_t$ may be a vector that includes a value for a brightness measured by the camera 114.

The agent 404 performs actions, which may be understood as increasing or decreasing camera setting values, such as for brightness, contrast, color, or sharpness. The action may affect one, some, or all of the settings at once or may make no change at all. The reward generated by the action is the value of an aggregate function that combines the values of the quality estimators 402.

Figure 5:
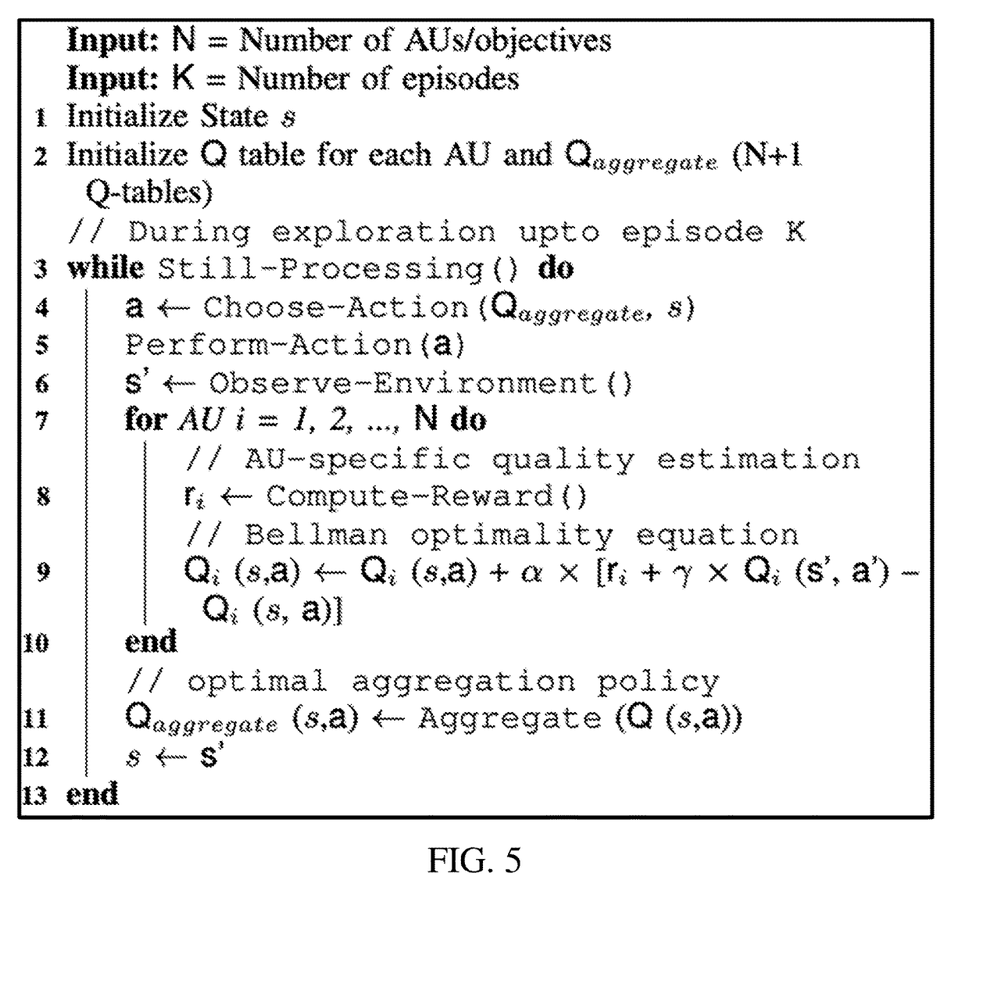
FIG. 5 is pseudo-code illustrating multi-objective reinforcement learning based on analytic quality estimation, in accordance with an embodiment of the present invention.

Referring now to FIG. 5, pseudo-code for multi-objective reinforcement learning is shown. First a state s and N+1 tables are initialized, with N tables corresponding to the N analytics units 204 and with a final table corresponding to the aggregated Q table. After initialization, an iterative process begins. The first step is to choose an action, following an ε-greedy policy based on the current state and values in the aggregated Q table.

The next step performs the action and, after changing the camera settings accordingly, the next modified state s' is observed. The immediate reward is computed for each analytics unit using estimators 402. The agent 404 independently updates the corresponding Q-table entry for each analytics unit 204, for example using the Bellman optimality equation. The term a is a learning rate and y is a discount factor. The learning rate controls the contribution of new information, with higher learning rate values corresponding to higher importance for recent information. The discount factor controls the priority given to long-term reward or immediate reward. When y is 1, the agent 404 values long-term rewards highly, whereas y of 0 causes the agent 404 to ignore long-term rewards and optimize for immediate rewards.

Once the Q-table entry for each analytics unit 204 is determined, the agent 404 uses an aggregation function to combine the Q-table values of each analytics unit 204 into an aggregate value, which is updated in the aggregated table. The state is then updated to s' and the iteration ends.

The agent 404 switches between exploration and exploitation strategies. In the ε-greedy policy, the value of ε controls the balance between exploration and exploitation. During exploration, the process of FIG. 5 is performed for a fixed number K iterations to populate the Q-tables. The agent 404 generates a random number between zero and one. If the random number is greater than the set value of ε, then a random action may be selected. Otherwise, the best action for the state s is selected according to a highest Q value in the aggregate table. Lower values of ε trigger more random actions, while a higher value of ε will trigger fewer random actions. The agent 404 uses a smaller ε value (e.g., 0.1) during exploration and a larger ε (e.g., 0.9) during exploitation. During exploration, the learning rate a may also be set to a relatively high value (e.g., 0.8), while during exploitation the learning rate may be set to a relatively low value (e.g., 0.2) to assimilate new information encountered during exploration.

Different aggregation strategies are available for generating the aggregated table. In a linear strategy, all analytics units 204 are given equal weight. The aggregate function may be computed by taking the average of the reward functions obtained from the different analytics units 204:

$$Q_{aggregate} = \sum_{i \in AU} Q_i[s,a]/\text{Count}_{AU}$$

where $\text{Count}_{AU}$ is a number of analytics units and $Q_i$ is a corresponding quality estimator 402 that determines a quality of an output of the corresponding analytics unit i.

In a weighted strategy, different weights are given to different analytics units 204 according to priorities of the analytics units 204 to compute an aggregate value:

$$Q_{aggregate} = \sum_{i \in AU} (p_i \cdot Q_i[s,a])/\sum_i p_i$$

where $p_i$ is a priority value associated with an analytics unit i. These weights may be assigned by domain experts or by any appropriate mechanism.

In a winner-takes-all strategy, the maximum reward from the Bellman equation among the different analytics units 204 is used:

$$Q_{aggeagate} = \max_{i \in AU} Q_i[s,a]$$

This strategy ensures that the selected action will be optimal for at least one of the analytics units 204.

The analytic unit quality estimators 402 include a feature extractor and a quality classifier that is specific to the respective analytics unit 204. The feature extractor may be any appropriate model that can handle the diverse impact of local textures, such as the Inception-v3 model. The extracted features may be used by the quality classifier to estimate the accuracy of the analytics unit 204. The classifier may be implemented with, e.g., two fully connected neural network layers. In some embodiments, the classifier may have an output of 101 classes, which encode a score with a value between zero and one hundred. corresponding to a score between zero and one hundred.

In an exemplary embodiment, the analytics units 204 may include face detection, person detection, car detection, and license plate detection. For each of these analytics units 204, a corresponding quality estimator 402 is determined. Although both person detection and car detection fall in the category of object detection, a more specific quality estimator may be used for each to handle inter-class variability. The quality estimators may be implemented as machine learning models trained using a cross-entropy loss function and a labeled dataset.

Figure 6:
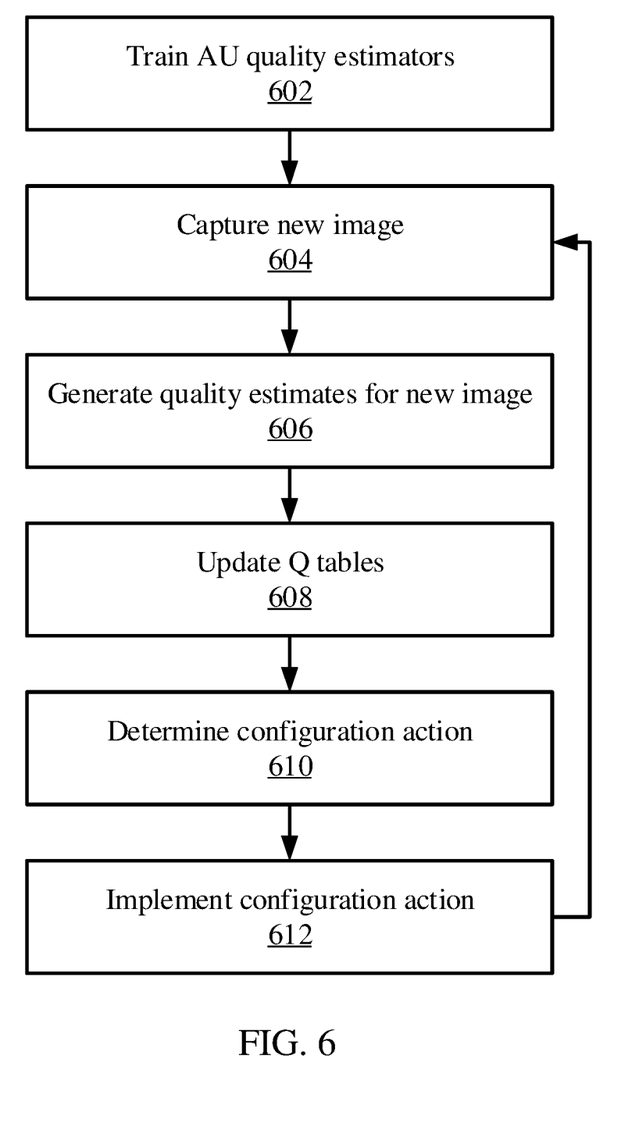
FIG. 6 is a block/flow diagram of a method for performing camera configuration responsive to analytics quality, in accordance with an embodiment of the present invention.

Referring now to FIG. 6, a method for dynamic configuration of a video camera is shown. Block 602 performs offline training of the quality estimators 402, for example using respective labeled training datasets. During online operation, a new image is captured 604 by the camera 114. The new image is processed by the trained quality estimators 402 to determine respective quality values in block 606. The Q tables of the agent 404 are updated in block 608, for example according to one of the $Q_{aggregate}$ strategies described above.

The reinforcement learning agent 404 then selects a configuration action to take in block 610. The action may be selected according to an exploration or exploitation mode, as described above, and reflects a change to one or more configuration parameters of the camera 114. Block 612 transmits the configuration parameter updates to the camera 114, where they may be implemented and used for subsequent image captures.

Figure 7:
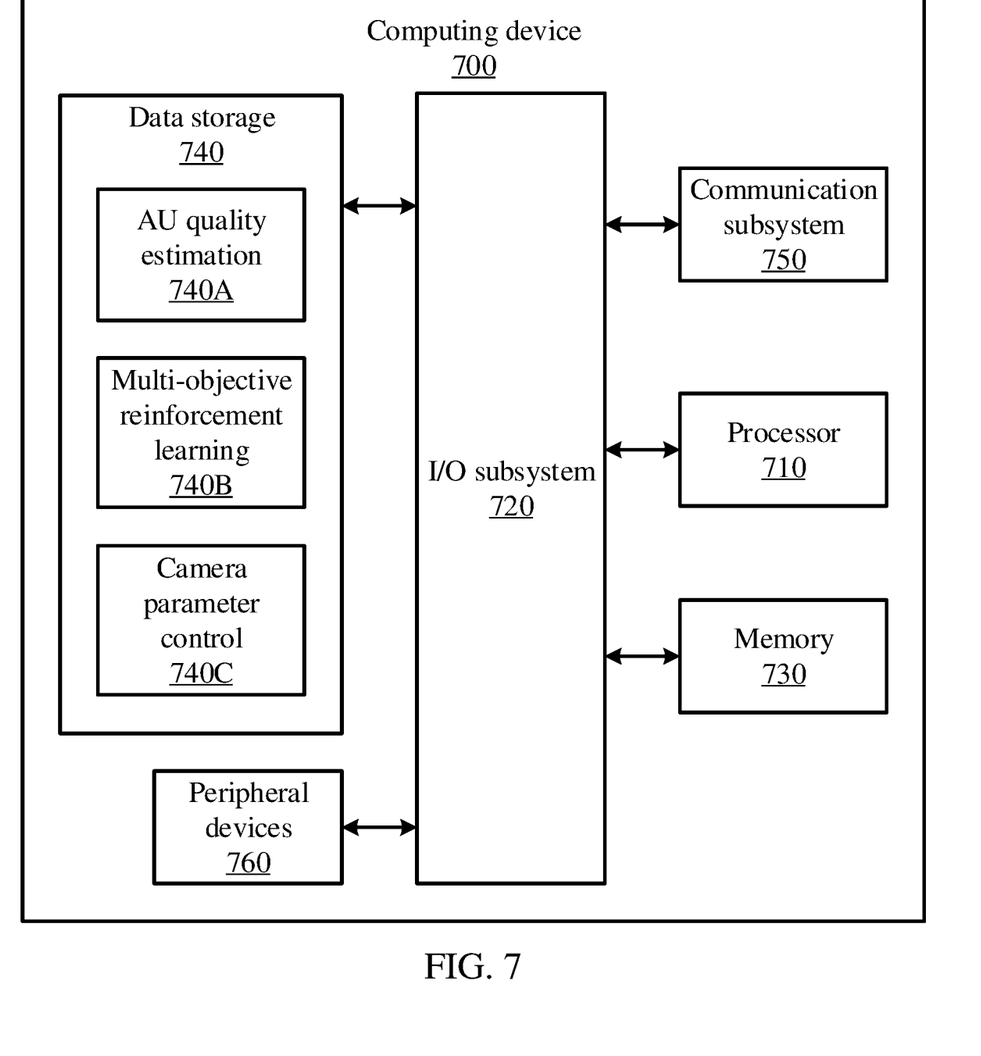
FIG. 7 is a block diagram of a computing device that can perform camera configuration responsive to analytics quality, in accordance with an embodiment of the present invention.

Referring now to FIG. 7, an exemplary computing device 700 is shown, in accordance with an embodiment of the present invention. The computing device 700 is configured to control camera configuration parameters.

The computing device 700 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 700 may be embodied as one or more compute sleds, memory sleds, or other racks, sleds, computing chassis, or other components of a physically disaggregated computing device.

As shown in FIG. 7, the computing device 700 illustratively includes the processor 710, an input/output subsystem 720, a memory 730, a data storage device 740, and a communication subsystem 750, and/or other components and devices commonly found in a server or similar computing device. The computing device 700 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 730, or portions thereof, may be incorporated in the processor 710 in some embodiments.

The processor 710 may be embodied as any type of processor capable of performing the functions described herein. The processor 710 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 730 may be embodied as any type of volatile or non-volatile memory or data storage capable of performing the functions described herein. In operation, the memory 730 may store various data and software used during operation of the computing device 700, such as operating systems, applications, programs, libraries, and drivers. The memory 730 is communicatively coupled to the processor 710 via the I/O subsystem 720, which may be embodied as circuitry and/or components to facilitate input/output operations with the processor 710, the memory 730, and other components of the computing device 700. For example, the I/O subsystem 720 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 720 may form a portion of a system-on-a-chip (SOC) and be incorporated, along with the processor 710, the memory 730, and other components of the computing device 700, on a single integrated circuit chip.

The data storage device 740 may be embodied as any type of device or devices configured for short-term or long-term storage of data such as, for example, memory devices and circuits, memory cards, hard disk drives, solid state drives, or other data storage devices. The data storage device 740 can store program code 740A for analytic unit quality estimation, 740B for multi-objective reinforcement learning, and/or 740C for camera parameter control. Any or all of these program code blocks may be included in a given computing system. The communication subsystem 750 of the computing device 700 may be embodied as any network interface controller or other communication circuit, device, or collection thereof, capable of enabling communications between the computing device 700 and other remote devices over a network. The communication subsystem 750 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 700 may also include one or more peripheral devices 760. The peripheral devices 760 may include any number of additional input/output devices, interface devices, and/or other peripheral devices. For example, in some embodiments, the peripheral devices 760 may include a display, touch screen, graphics circuitry, keyboard, mouse, speaker system, microphone, network interface, and/or other input/output devices, interface devices, and/or peripheral devices.

Of course, the computing device 700 may also include other elements (not shown), as readily contemplated by one of skill in the art, as well as omit certain elements. For example, various other sensors, input devices, and/or output devices can be included in computing device 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 700 are readily contemplated by one of ordinary skill in the art given the teachings of the present invention provided herein.

Figure 8:
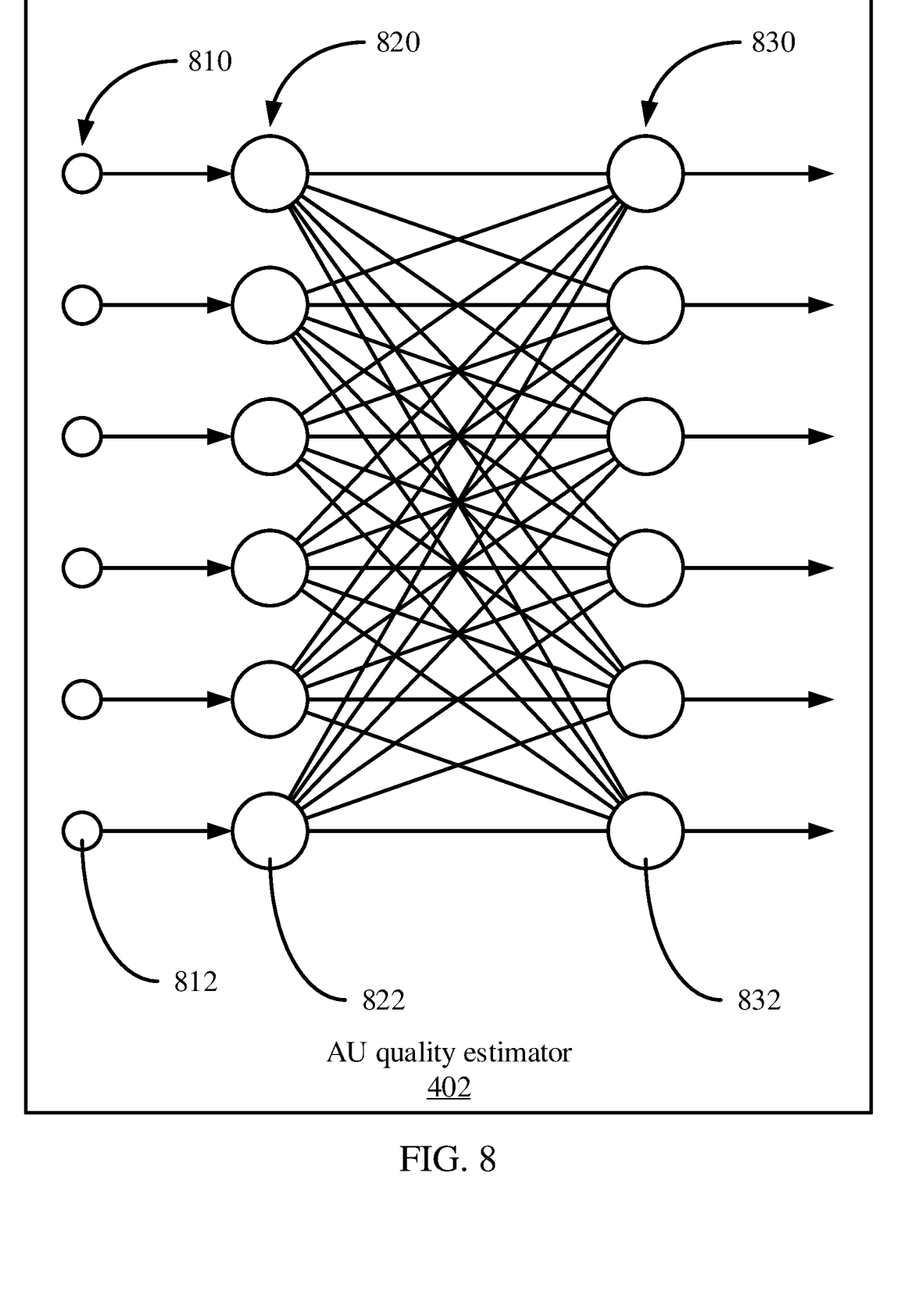
FIG. 8 is an exemplary neural network architecture that can be used to implement analytics quality estimation, in accordance with an embodiment of the present invention.
Figure 9:
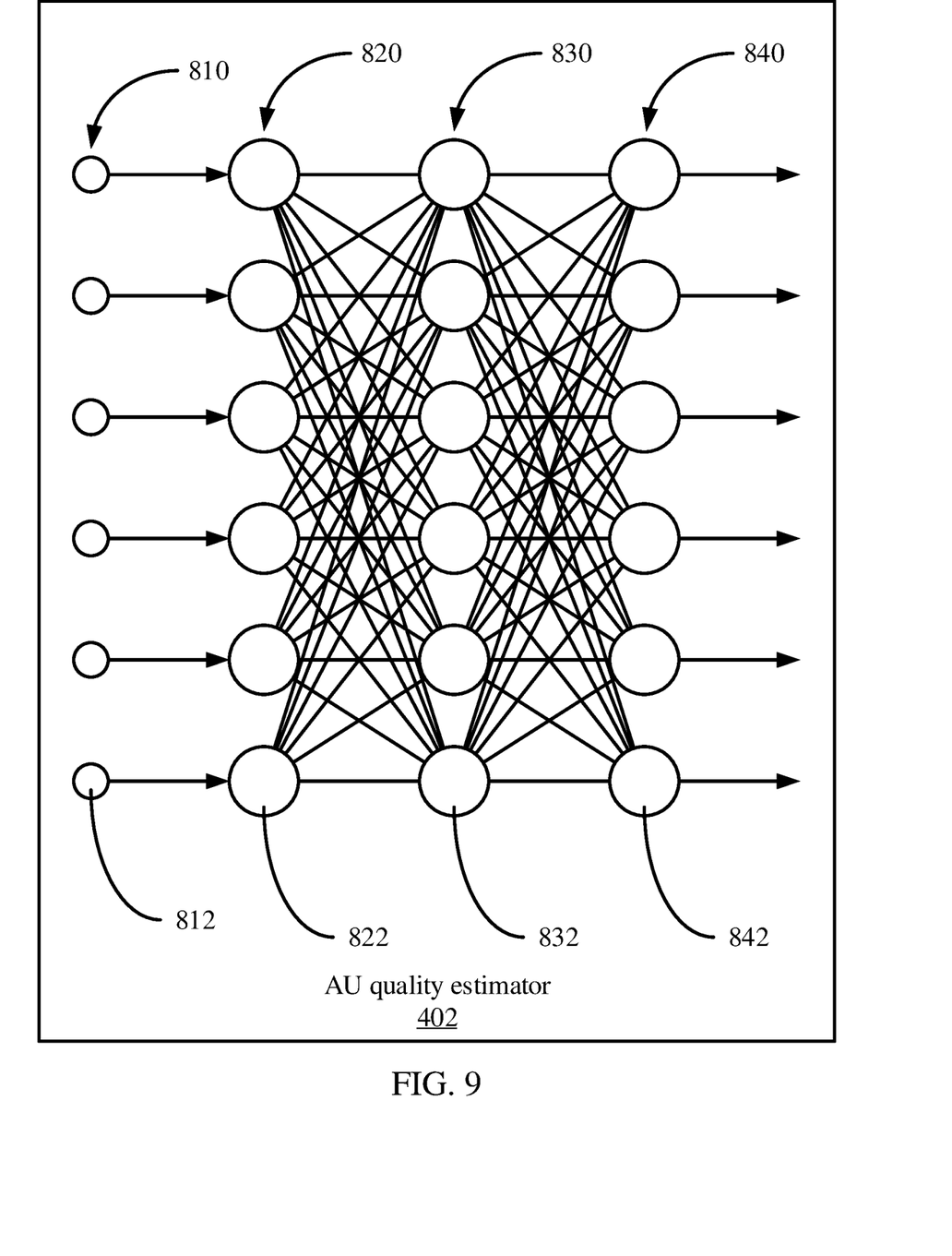
FIG. 9 is an exemplary deep neural network architecture that can be used to implement analytics quality estimation, in accordance with an embodiment of the present invention.

Referring now to FIGS. 8 and 9, exemplary neural network architectures are shown, which may be used to implement parts of the present models, such as the analytics unit quality estimators 402. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be output.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 820 of source nodes 822, and a single computation layer 830 having one or more computation nodes 832 that also act as output nodes, where there is a single computation node 832 for each possible category into which the input example could be classified. An input layer 820 can have a number of source nodes 822 equal to the number of data values 812 in the input data 810. The data values 812 in the input data 810 can be represented as a column vector. Each computation node 832 in the computation layer 830 generates a linear combination of weighted values from the input data 810 fed into input nodes 820, and applies a non-linear activation function that is differentiable to the sum. The exemplary simple neural network can perform classification on linearly separable examples (e.g., patterns).

A deep neural network, such as a multilayer perceptron, can have an input layer 820 of source nodes 822, one or more computation layer(s) 830 having one or more computation nodes 832, and an output layer 840, where there is a single output node 842 for each possible category into which the input example could be classified. An input layer 820 can have a number of source nodes 822 equal to the number of data values 812 in the input data 810. The computation nodes 832 in the computation layer(s) 830 can also be referred to as hidden layers, because they are between the source nodes 822 and output node(s) 842 and are not directly observed. Each node 832, 842 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-}, w_n$. The output layer provides the overall response of the network to the inputted data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 832 in the one or more computation (hidden) layer(s) 830 perform a nonlinear transformation on the input data 812 that generates a feature space. The classes or categories may be more easily separated in the feature space than in the original data space.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for camera configuration, comprising:

configuring an image capture configuration parameter of a camera according to a multi-objective reinforcement learning aggregated reward function;
determining respective quality estimates by a plurality of analytics unit quality estimators after configuring the image capture parameters; and
updating the aggregated reward function based on the quality estimates from the plurality of analytics unit quality estimators.

2. The method of claim 1, wherein determining the quality estimates includes applying respective trained estimator models that have been trained to accuracy for respective analytics tasks.

3. The method of claim 1, wherein updating the aggregated reward function combines the quality estimates according to an aggregation strategy.

4. The method of claim 3, wherein the multi-objective reinforcement learning uses a linear aggregation strategy.

5. The method of claim 3, wherein the multi-objective reinforcement learning uses a winner-takes-all aggregation strategy.

6. The method of claim 3, wherein the multi-objective reinforcement learning uses a weighted aggregation strategy.

7. The method of claim 1, wherein the image capture configuration parameter is selected from the group consisting of control brightness, contrast, color, sharpness, and focus.

8. The method of claim 1, further comprising training respective quality estimation models, for the plurality of analytics, to determine quality estimates based on an input image.

9. The method of claim 1, further comprising capturing a new image with the camera after changing the image capture configuration parameter, wherein determining the quality estimates is done using the new image.

10. The method of claim 1, wherein the multi-objective reinforcement learning treats a present set of image capture configuration parameters as a state of the camera and uses the aggregated reward function to determine an action that reflects a change in one or more of the image capture configuration parameters to balance performance of the plurality of analytics.

11. A system for camera configuration, comprising:
a hardware processor; and
a memory that stores a computer program which, when executed by the hardware processor, causes the hardware processor to:
configure an image capture configuration parameter of a camera according to a multi-objective reinforcement learning aggregated reward function;
determine respective quality estimates by a plurality of analytics unit quality estimators after configuring the image capture parameters; and
update the aggregated reward function based on the quality estimates from the plurality of analytics unit quality estimators.

12. The system of claim 11, wherein the computer program further causes the hardware processor to apply respective trained estimator models that have been trained to accuracy for respective analytics tasks.

13. The system of claim 11, wherein the computer program further causes the hardware processor to combine the quality estimates according to an aggregation strategy.

14. The system of claim 13, wherein the multi-objective reinforcement learning uses a linear aggregation strategy.

15. The system of claim 13, wherein the multi-objective reinforcement learning uses a winner-takes-all aggregation strategy.

16. The system of claim 13, wherein the multi-objective reinforcement learning uses a weighted aggregation strategy.

17. The system of claim 11, wherein the image capture configuration parameter is selected from the group consisting of control brightness, contrast, color, sharpness, and focus.

18. The system of claim 11, further comprising training respective quality estimation models, for the plurality of analytics, to determine quality estimates based on an input image.

19. The system of claim 11, wherein the computer program further causes the hardware processor to capture a new image with the camera after changing the image capture configuration parameter, wherein determining the quality estimates is done using the new image.

20. The system of claim 11, wherein the multi-objective reinforcement learning treats a present set of image capture configuration parameters as a state of the camera and uses the aggregated reward function to determine an action that reflects a change in one or more of the image capture configuration parameters to balance performance of the plurality of analytics.

* * * * *